United States Patent Office 3,121,268
Patented Feb. 18, 1964

3,121,268
CORE COMPOSITIONS AND CORE
Louis C. Rubens, Midland, Mich., assignor to The Dow
Chemical Company, Midland, Mich., a corporation of
Delaware
No Drawing. Filed Dec. 21, 1959, Ser. No. 860,727
9 Claims. (Cl. 22—194)

This invention relates to resin-filler systems, more particularly to molding cores prepared from reactive vinyl type monomer binders, and to a process for the preparation of such cores.

The production of cores for metal casting normally involves the addition to core sand of small amounts of a resinous binder, e.g. phenol-formaldehyde or urea-formaldehyde. This addition permits the sand to be shaped to a desired form, or core, after which, heat or other treatments are used to convert the formed, uncured ("green"), sandbinder mixture into a hard, solid, cured state. Generally, use of such conventional binders requires prolonged heating of the "green" cores in a holding mold to produce a hard, cured core. This process thus requires in addition to the lengthy treatment time, a large investment in the number of holding molds needed to hold the cores dimensionally stable during the lengthy cure. Now, unexpectedly, this invention describes a system whereby upon mixing a vinyl type monomer binder and sand, "green" cores can be prepared and shaped. These cores can be almost instantaneously converted at room temperature to a final, cured core by treatment with a gaseous, ionic, polymerization catalyst. It is the principal object of the present invention to provide compositions and a process for the rapid preparation of molding cores. An object of this invention is to provide an extremely rapid conversion of "green" cores to a cured state by a simple room temperature treatment. Another object is to provide a means of converting the resin-producing monomer binder into its polymeric form in the original shaping mold thereby eliminating both the need for use of subsequent holding molds or forms and for mechanical handling of the molded cores in the weak, "green" state as is now conventionally done. A further object is to provide cores that are easily shaped by using the vinyl monomer binder. Additionally, the cured cores exhibit good collapsibility in the metal casting process. Still other objects and advantages will be apparent from the following detailed description of the invention presented hereinafter.

This invention comprises; (1) preparing a mixture containing a particulate inorganic or organic filler and from about 1 to about 10 percent, preferably from about 2 to about 4 percent, on the filler weight, of a binder which is either a polyfunctional vinyl type monomer or a mixture of a monofunctional vinyl and polyfunctional vinyl monomer, all of the vinyl materials being capable of undergoing polymerization in the presence of a gaseous, ionic, polymerization catalyst; (2) placing the composition in a mold; (3) tamping the composition in the mold in a conventional manner to prepare a "green" core; and, (4) treating the "green" core for a short period of time at room temperature with a gaseous, electrophilic, ionic, polymerization catalyst thereby to provide a cured core.

The filler phase of the core mixture can be any of the conventionally used inert, particulated or fibrous organic or inorganic filler materials, e.g. sand, powdered quartz, clays, mica, glass, asbestos, wood flour, wheat flour, polyacrylonitrile, cotton, nylon and the like. Of these materials, sand ordinarily is used in the preparation of cores. In the instant compositions, satisfactory cores result using "bank" sand, normally used by foundries for core production, which has not been washed or cleaned and therefore still contains a small amount of clay, moisture and organic materials. However, if washed and dried sand is used from which these latter contaminants have been removed, cores with somewhat higher tensile strength and hardness result.

Vinyl type monomers useful in preparing cores of the present invention are limited to those materials which polymerize readily in the presence of an ionic catalyst, and which, when admixed with a filler, upon polymerization produce cured cores of acceptable tensile strengths. Suitable monomers for use in the instant compositions are vinyl ethers, vinyl aromatics and alkenes. These include polyfunctional vinyl materials and alkadienes, i.e. those compounds having more than one double bond e.g., divinylether or diethylene glycol, divinylethers of bis-phenols, divinylalkyl ethers, and butadiene. Monofunctional vinyl monomers and alkenes, i.e. those having one double bond, e.g. styrene, isobutylene, $\alpha$-methyl styrene, monovinylether of diethyleneglycol, vinylisobutyl ether and ethylvinyl benzene, which are similarly polymerizable can also form rigid members when polymerized with a filler. Selection of a specific monomer or mixture of monomers will be dependent upon the specific use of the cores ultimately desired. For example, in metal molding, the tensile strength of the core must be at least 100 pounds per square inch. Therefore, the selection of monomers in this case is limited to poly-functional vinyl monomers or mixtures of polyfunctional vinyl monomers and monofunctional vinyl monomers containing less than 50 percent of the monofunctional vinyl monomers. In other instances, where tensile strengths of the cores can be less than 100 pounds per square inch, the monofunctional vinyl monomer may be present in quantities as high as 90 percent, with consequent loss in tensile strength. Additionally, inclusion of a small amount, up to about two percent on the total weight of the core composition, of a tough, high molecular weight resin, e.g. polyvinyl chloride, polystyrene latex particles or polystyrene-divinyl benzene mixtures into a polyfunctional vinyl monomer sand core composition also is found to improve somewhat the properties of the core.

In direct contrast to certain prior art systems, the presence of impurities in the monomer system, e.g., water, aldehydes, monovinyl ether of diethylene glycol, hexamethylene diamine, tert.-dodecyl mercaptan, and formaldehyde of up to 10,000 parts per million or more on the weight of the polyfunctional vinyl monomer causes some reduction in physical properties of the cured cores but these impurities still do not reduce the effective utility of the cores.

The binder and sand core are blended together by means of a conventional mixer or muller apparatus.

Catalysts used to carry out the polymerization of the vinyl monomers and thereby cure the core are gaseous, electrophilic, strong Lewis acids; e.g., boron trifluoride, titanium tetrachloride vapor, tin tetrachloride vapor and the like.

Boron trifluoride is an especially effective catalyst for it is a gas at normal temperatures and readily can be forced through porous media of the present compositions which result from mixing small amount of the vinyl monomer with granular and fibrous particles. The actual quantity of boron trifluoride catalyst needed for curing the cores is not critical and is a quite small amount. For example, a 3 second treatment with boron trifluoride at a flow rate of about 0.17 cubic foot per minute of a standard tensile strength core which contained about 97 grams sand and about 3 grams of the divinyl ether of diethylene glycol gave a hard, cured core. In a second test, the boron trifluoride was diluted with an inert gas e.g., air, to a ratio of about 26:1. A standard tensile strength test core was treated with this gas mixture for about 3 seconds as above. This gas mixture was found to be just as effective a catalyst as the boron trifluoride alone in preparing the rapidly cured core. With diluted mixtures of the catalyst, more total gas can be forced through the core mixture thereby helping to eliminate non-catalyzed or "dead spots" in a core. The problem of dead spots is prevalent in large, complex forms which may contain a number of such areas that are not easily penetrated by the catalytic vapors at low velocities and low pressures. Overgassing with boron trifluoride can result both in a discoloration of the cured core along with a reduction in the physical properties of the core.

Ordinarily in this process the boron trifluoride catalyst is passed under pressure through the core mold, but alternatively the catalyst can be rapidly sucked into a partially evacuated mold. Any excess of the toxic boron trifluoride catalyst which remains in or on the cured core after treatment conveniently can be removed from the core by purging with an inert gas, by employing a brief vacuum treatment, or by treating the core with ammonia gas.

With compositions of the present invention and by using the present process of core preparation, cores are produced which have acceptable tensile strengths and hardness ratings as measured using the Standard A.F.S. Core Tensile Test and Core Hardness Test described by Dietert, Foundry Core Practice, pp. 377–380, 385–386 American Foundrymen's Society, Chicago 1950.

Cores produced by the system of the present process have acceptable physical property values as produced. However, at controlled, low humidities the tensile strength of the cores continues to rise with increasing time for up to about 48 hours. Under conditions of high humidity, above about 70 percent relative humidity, the strength of the cores is found to decrease with time. In actual practice therefore a determination of the maximum time before use would be determined by the combined effects of these two opposing factors. Introduction of a small amount, about 1 percent on weight of the vinyl monomer, of a silicone resin into the core composition prior to polymerization aids in offsetting the effect of core deterioration during storage at high humidities and thereby lengthens the effective core life.

The present invention is illustrated further by the following examples, but is not construed to be limited thereto.

EXAMPLE 1

A batch of about 3920 grams of unwashed, "bank" foundry core sand and about 80 grams of the divinyl ether of diethylene glycol was blended in a conventional sand blender for about two minutes at room temperature. The resulting mixture had the consistency of a slightly damp beach sand. One hundred gram samples of this composition were used to prepare standard foundry tensile test core specimens by the following procedure. The sand-2 percent monomer mixture was tamped into a standard core tensile test mold after which boron trifluoride gas (flow rate of about 0.17 cu. ft. per minute) was forced through the mixture in the mold for about 3 seconds. Following this, air was then blown through the cured core to remove any residual boron trifluoride. The core then was removed from the mold and its tensile strength and hardness determined using standard test procedures. The cores as removed from the mold had an average tensile strength of about 120 pounds per square inch. Aging the cores for 48 hours at about zero percent relative humidity raised this value to about 150 pounds per square inch.

EXAMPLE 2

A mold was prepared in the following manner to test the effects of hot molten metal on cores prepared using the same composition as described in Example 1.

A 1 inch thick layer of the 98 percent sand-2 percent vinyl monomer mixture was tamped into the bottom of a wooden box having inside dimensions of about 4½ in. x 4½ in. x 6 in. high. Another wooden box having outside dimensions of about 3½ in. x 3½ in. x 6 in. was placed on top of this sand layer and spaced equi-distance from the sides of the first box. More of sand-monomer mixture was used to fill the space between the boxes and tamped to form a compact mass. The mold was then inverted and the bottom of the outer wooden box removed. Boron trifluoride gas was then forced through the sand-monomer mixture for five seconds at a flow rate of about 0.17 cu. ft./min. during which treatment the divinyl ether of diethylene glycol polymerized and bonded the sand together to give a cured hard, sand core in the form of a box. The inside wooden box was then removed, thereby exposing the interior of the sand-resin box.

A core for this mold was prepared in the following manner; The bottom of a standard 8 oz. rectangular glass bottle was cut off and the sand-monomer mixture was used to fill the interior of the bottle and tamped to form a compact mass. Boron trifluoride was forced through the sand-monomer composition for 5 seconds, as before, to harden the core. The glass then was broken away from the core. The bottom of this core was dampened with divinyl ether of diethylene glycol and the core was placed in the bottom of the previously prepared sand-resin box. Boron trifluoride was now forced through the entire assembly for five seconds as before to cause the core to bond to the sand-resin box.

Molten lead at a temperature of about 650° C. was poured into the resultant mold described above. The following observations were noted during the molding: Very little vapor was given off, and the mold maintained good dimensional stabiltiy during the casting operation.

After cooling, the entire assembly was placed in a pail of water and in a few minutes the mold and core disintegrated leaving the metal casting essentially free of attached sand. Good duplication of mold cavity was achieved in the metal casting thus prepared.

EXAMPLE 3

A series of tests were run evaluating the effects of storage time and humidity upon the strength of cores prepared from a composition containing about 3 percent of the divinyl ether of diethylene glycol and about 97 percent of washed sand both with and without addition of a silicone resin.

In carrying out these tests, a series of standard tensile strength test cores was prepared using 3 percent monomer-sand composition wherein the divinyl ether of diethylene glycol was of about 98.4 percent purity. Each core was cured by contact for about 3 seconds with boron trifluoride and the cores then stored for various periods of time in desiccators maintained at various humidities. Additionally, a second series of cores in which about 1 percent (on weight of vinyl monomer) of a silicone resin was added to the monomer prior to mixing with the core sand, was prepared and similarly stored.

Table I, which follows, compares the tensile strength and hardness ratings obtained for these cores after various storage periods.

Table I

EFFECTS OF STORAGE TIME AND HUMIDITY UPON THE STRENGTH OF 3 PERCENT DIVINYL ETHER OF DIETHYLENE GLYCOL–97 PERCENT WASHED SAND CORES

| Test No. | Silicone Resin [1] Containing | Storage Time (hours) | Humidity in Storage Vessel | Tensile Strength (p.s.i.) | Hardness |
|---|---|---|---|---|---|
| 1 | No | Immediate Test | | 275 | 89 |
| 2 | Yes | do | | 312 | 92 |
| 3 | No | 1 | 0 | 215 | 87 |
| 4 | No | 3 | 0 | 170 | 87 |
| 5 | Yes | 3 | 0 | 300 | 92 |
| 6 | No | 1 | 31 | 115 | 85 |
| 7 | No | 3 | 31 | 150 | 86 |
| 8 | No | 1 | 71 | 115 | 82 |
| 9 | Yes | 1 | 71 | 180 | 91 |
| 10 | No | 3 | 71 | 10 | 81 |
| 11 | Yes | 3 | 71 | 150 | 21 |
| 12 | No | 1 | 100 | 110 | 98 |
| 13 | Yes | 1 | 100 | 152 | 90 |
| 14 | No | 3 | 100 | 1 | 76 |
| 15 | Yes | 3 | 100 | 135 | 90 |

[1] Commercial resin of the type such as 129-G (product of Dow Corning Corporation).

EXAMPLE 4

Using the same procedure of core production as described in Example 1, a series of cores was prepared using mixtures of divinyl ether of diethylene glycol and a monofunctional vinyl monomer as the binder. The physical properties of resulting cores, after curing for about 1 hour at about zero degree humidity are tabulated in Table II which follows:

Table II

EFFECT OF MONOFUNCTIONAL VINYL MONOMER ADDITION TO BINDER COMPOSITION ON STRENGTH OF SAND CORES

| Test No. | Total Monomer, Percent | Monomer Composition | | | Tensile Strength p.s.i. |
|---|---|---|---|---|---|
| | | Divinyl Ether of Diethylene Glycol, Percent of Binder Comp. | Monofunctional Vinyl Monomers | | |
| | | | Classification | Percent of Binder Comp. | |
| 1 | 3 | 100 | | | 203 |
| 2 | 2 | 100 | | | 156 |
| 3 | 3 | 65 | Vinyl isobutyl ether | 35 | 141 |
| 4 | 3 | 64 | Styrene | 36 | 107 |

EXAMPLE 5

Cores used in molding part of a valve assembly were prepared by tamping compositions shown in Table III which follows into a corresponding corebox in a conventional manner followed by forcing boron trifluoride through the "green" core for about 5 seconds. Gas penetration appeared to be quite uniform and good curing of the core resulted. The so-cured cores then were stored for about 72 hours under normal atmospheric conditions after which time they were used in a normal iron casting operation. No abnormal behavior of the core was observed during casting, and the cores collapsed in a satisfactory manner. Separation of the disintegrated core from the cooled casting was easily accomplished simply by shaking the casting. The results of several tests using the various core composition are summarized in Table III which follows:

Table III

| Test No. | Core Composition | | | Test Results |
|---|---|---|---|---|
| | Divinyl Ether of Diethylene Glycol (Percent) | Plastisol Grade Polyvinyl Chloride (Percent) | Sand (Percent) | |
| 1 | 2 | 0 | 98 | Core somewhat weak, molten iron had feathered surface. |
| 2 | 2 | 1 | 97 | Very good smooth casting, sharp edges sand flowed out of cool casting. |
| 3 | 3 | 1 | 96 | Casting very good, same comments as for Test 2. |

In a manner similar to that described for the foregoing examples, rigid cores can result by treating in a core mold a tamped mixture of about 10 percent of divinylether of diethylene glycol and about 90 percent sand with tin tetrachloride vapors, a mixture of about 4 percent of divinyl ether of a bisphenol and about 96 percent of powdered quartz with gaseous boron trifluoride, a mixture of about 3 percent isobutylene and about 97 percent glass fibers with titanium tetrachloride vapor, a mixture of about 8 percent α-methyl styrene and about 92 percent clay with gaseous boron trifluoride, a mixture of about 6 percent vinyl butyl ether and about 94 percent nylon fibers with tin tetrachloride vapor, a mixture of about 7 percent butadiene and about 93 percent mica with titanium tetrachloride vapors, a mixture of about 5 percent aggregate concentration of divinyl ether of diethylene glycol (80 parts) and monovinyl ether of diethylene glycol (20 parts) and about 95 percent cotton fiber with tin tetrachloride vapor, a mixture of about 3 percent aggregate concentration of divinyl ether of diethylene glycol (90 parts) and ethylvinyl benzene (10 parts) and about 97 percent polyacrylonitrile with gaseous boron trifluoride, a mixture of about 9 percent vinyl ethyl ether and about 91 percent wood flour with tin tetrachloride vapor, a mixture of about 1 percent divinylether of diethylene glycol with about 99 percent sand with titanium tetrachloride vapor, a mixture of about 6 percent aggregate concentration of isobutylene (70 parts) and styrene (30 parts) and about 94 percent asbestos with gaseous boron trifluoride and a mixture of about 4 percent of divinyl ether of diethylene glycol, 1 percent polystyrene and about 95 percent wheat flour with gaseous boron trifluoride.

Any of the suggested vinyl monomer binder systems can be blended with any of the suggested fillers and the resulting compositions treated with any of the suggested gaseous ionic polymerization catalysts according to the process of this invention to yield rapidly cured hard filler-resin compositions.

Various modifications may be made in the present invention without departing from the spirit or scope thereof for it is understood that I limit myself only as defined in the appended claims.

I claim:

1. A rapid curing core composition possessing a tensile strength of at least about 100 pounds per square inch upon curing which comprises from about 2 to about 4 percent of divinylether of diethylene glycol and from about 96 to about 98 percent sand, said ether being rapidly polymerizable in the presence of an electrophilic, gaseous, strong Lewis acid catalyst.

2. The composition of claim 1 wherein up to about 35 percent of the divinylether of diethylene glycol is replaced by a monofunctional monomer selected from the group consisting of styrene, isobutylene, α-methyl styrene, monovinylether of diethylene glycol, vinylisobutyl ether and ethyl vinyl benzene.

3. A rapid curing core composition possessing a tensile strength of at least about 100 pounds per square inch upon curing which comprises from about 2 to about 4 percent of divinylether of diethylene glycol, from about 1 to about 2 percent of a tough, high molecular weight resin selected from the group consisting of polyvinyl chloride, polystyrene latex particles and polystyrene-divinyl benzene mixtures and from about 94 to about 97 percent sand, said divinylether being rapidly polymerizable in the presence of an electrophilic, gaseous strong Lewis acid catalyst.

4. A process for the preparation of rapidly cured cores possessing a tensile strength of at least about 100 pounds per square inch upon curing which comprises; blending a mixture of from about 2 to about 4 percent of divinyl ether of diethylene glycol and from about 96 to about 98 percent sand, molding the so-blended mixture into a core in a conventional core mold, treating said core with an electrophilic gaseous, strong Lewis acid catalyst for a period of time sufficient to polymerize said divinyl ether and thereby cure the core, and removing said cured core from said mold.

5. The process of claim 4 wherein the catalyst is boron trifluoride.

6. The process of claim 4 wherein up to about 35 percent of the ether is replaced by a monofunctional monomer selected from the group consisting of styrene, isobutylene, α-methyl styrene, monovinylether of diethylene glycol, vinylisobutyl ether and ethylvinyl benzene.

7. The process of claim 4 wherein about 1 percent of silicone resin on weight of the divinyl ether of diethylene glycol is admixed with said ether prior to mixing said ether with the sand, said resin being added in amounts up to about 2 percent of the weight of said divinyl ether.

8. A process for the preparation of rapidly cured cores which comprises; blending a mixture of from about 2 to about 4 percent of divinyl ether of diethylene glycol, from about 1 to about 2 percent of a tough high molecular weight resin selected from the group consisting of polyvinyl chloride, polystyrene latex particles and polystyrene-divinyl benzene mixtures and from about 94 to about 97 percent sand, molding said blended mixture into a core in a conventional core mold, treating said core for a period of time sufficient to polymerize said ether with an electrophilic, gaseous strong Lewis acid catalyst thereby curing said core, and removing said cured core from said mold.

9. A rapid curing core composition possessing substantial tensile strength upon curing which comprises from about 1 to about 10 weight percent of divinylether of diethylene glycol binder and from about 90 to about 99 percent of sand, said divinylether of diethylene glycol binder being polymerizable in the presence of a gaseous, electrophilic, strong Lewis acid catalyst.

References Cited in the file of this patent

UNITED STATES PATENTS

| | | |
|---|---|---|
| 2,683,296 | Drumm et al. | July 13, 1954 |
| 2,706,163 | Fitko | Apr. 12, 1955 |
| 2,874,428 | Bonney | Feb. 24, 1959 |
| 2,910,748 | Hammer | Nov. 3, 1959 |
| 2,963,456 | Betts | Dec. 6, 1960 |
| 3,008,205 | Blaies | Nov. 14, 1961 |

FOREIGN PATENTS

| | | |
|---|---|---|
| 526,345 | Great Britain | Sept. 17, 1940 |

OTHER REFERENCES

Journal of the Chemical Society, 1947, part 1, pages 252–280.

Polymers and Resins by Brage Golding, published by D. Van Nostrand Co., Inc., 1959, Princeton, N.J., pages 39, 40, 41, 438, 439, 440.